United States Patent
Nagafuchi et al.

(10) Patent No.: US 11,289,778 B2
(45) Date of Patent: Mar. 29, 2022

(54) CONNECTOR MODULE AND POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Akihiro Nagafuchi, Mie (JP); Tomotaka Kurozu, Mie (JP); Rintaro Negishi, Osaka (JP); Yusuke Kunii, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 83 days.

(21) Appl. No.: 16/979,702

(22) PCT Filed: Mar. 1, 2019

(86) PCT No.: PCT/JP2019/008036
§ 371 (c)(1),
(2) Date: Sep. 10, 2020

(87) PCT Pub. No.: WO2019/176584
PCT Pub. Date: Sep. 19, 2019

(65) Prior Publication Data
US 2021/0043908 A1    Feb. 11, 2021

(30) Foreign Application Priority Data
Mar. 16, 2018   (JP) .............................. JP2018-049568

(51) Int. Cl.
*H01M 50/502*   (2021.01)
*H01M 50/543*   (2021.01)
(Continued)

(52) U.S. Cl.
CPC ..... *H01M 50/502* (2021.01); *H01M 10/0413* (2013.01); *H01M 10/425* (2013.01);
(Continued)

(58) Field of Classification Search
None
See application file for complete search history.

(56) References Cited

U.S. PATENT DOCUMENTS

2012/0328908 A1\* 12/2012 Han ................... H01M 50/209
                                                                 429/7
2016/0149192 A1   5/2016 Motokawa

FOREIGN PATENT DOCUMENTS

JP    2015-65055    4/2015
JP    2017-98043    6/2017
(Continued)

OTHER PUBLICATIONS

International Search Report issued in International Patent Application No. PCT/JP2019/008036, dated Jun. 4, 2019, together with an English translation thereof.

*Primary Examiner* — Wyatt P McConnell
(74) *Attorney, Agent, or Firm* — Greenblum & Bernstein, P.L.C.

(57) ABSTRACT

A power storage module includes a power storage component unit and a connector module. The power storage component unit includes power storage components including electric terminals positive terminals, negative terminals) on one side. The connector module is attached to the power storage component unit to electrically connect the power storage components. The connector module includes bus (Continued)

bars and a holder. The bus bars connect the electric terminals of the power storage components that are adjacent to each other. The holder holds the bus bars. The holder includes a bus bar holding surface that includes bus bar placing sections on which the bus bars are placed. The holder includes restricting receptacles and restricting tabs fitted to the bas bars placed on the bus bar placing sections to restrict removal of the bus bars from the holder and displacement of the bus bars from the bus bar placing sections.

9 Claims, 9 Drawing Sheets

(51) Int. Cl.
  *H01M 50/572* (2021.01)
  *H01M 50/20* (2021.01)
  *H01M 10/04* (2006.01)
  *H01M 10/42* (2006.01)

(52) U.S. Cl.
  CPC ......... *H01M 50/20* (2021.01); *H01M 50/543* (2021.01); *H01M 50/572* (2021.01); *H01M 2220/20* (2013.01)

(56) References Cited

FOREIGN PATENT DOCUMENTS

| KR | 10-1547400 | 8/2015 |
| WO | 2015/019570 | 2/2015 |

\* cited by examiner

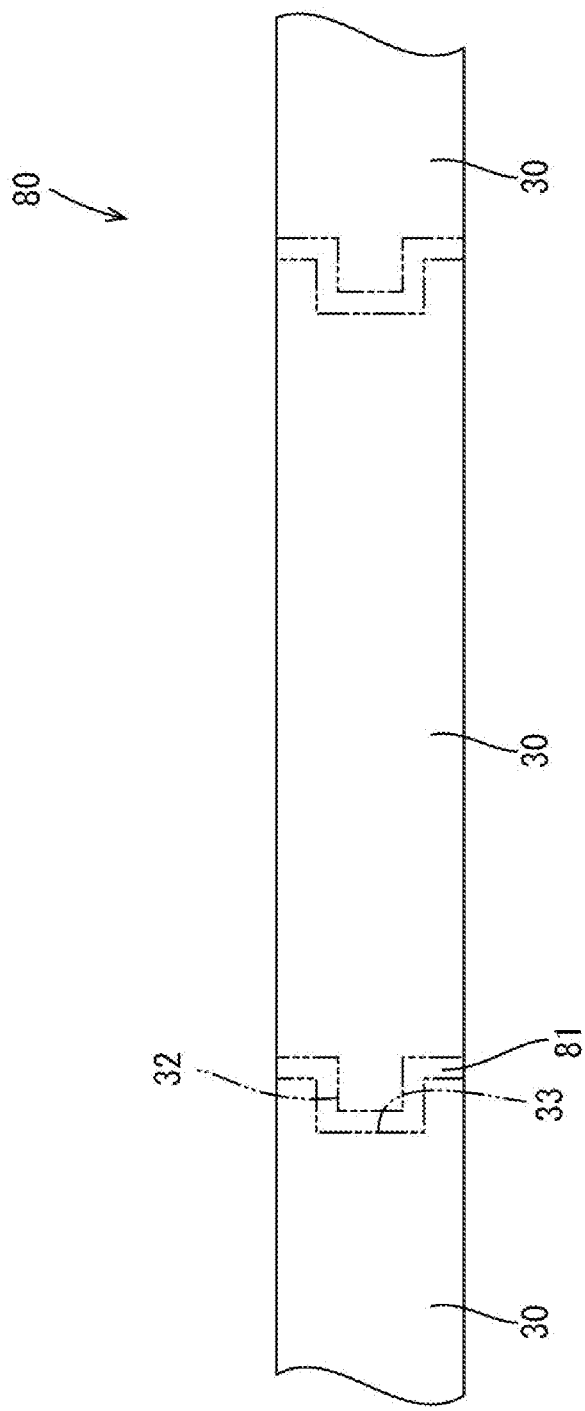

CONNECTOR MODULE AND POWER STORAGE MODULE

TECHNICAL FIELD

The technology disclosed herein relates to a connector module and a power storage module.

BACKGROUND ART

A power storage module for a vehicle includes battery cells, bus bars, and bus bar holders. The battery cells include positive and negative terminals. The bus bars connect the terminals of the adjacent battery cells. The bus bar holders are attached to the battery cells to hold the bus bars. The bus bar holders include surrounding walls that hold the bus bars. With the surrounding walls, the bus bars are positioned relative to the bus bar holders and the adjacent bus bars are isolated from each other.

RELATED ART DOCUMENT

Patent Document

[Patent Document 1] Japanese Unexamined Patent Application Publication No. 2015-065055

SUMMARY OF THE INVENTION

Problem to be Solved by the Invention

Because of current demands for efficient arrangement of a larger number of parts in a limited space for improvements in vehicle performances, a configuration for holding the bus bars in the power storage module needs to be simplified.

Means for Solving the Problem

A connector module disclosed herein is attached to a power storage component unit including power storage components including electric terminals on one side to electrically connect the power storage components. The connector module includes connecting members and a holder. The connecting members connect the electric terminals of the power storage components adjacent to each other. The holder holds the connecting members. The holder includes a surface including placing sections on which the connecting members are placed. The holder includes restricting portions fitting on the connecting members placed on the placing sections to restrict removal of the connecting members from the holder and displacement of the connecting members from the placing sections without surrounding walls that surround the connecting members placed on the placing sections.

A power storage module described herein includes a power storage component unit and a connector module. The power storage component unit includes power storage components including electric terminals on one side. The connector module is attached to the power storage component unit to electrically connect the power storage components. The connector module includes connecting members and a holder. The connecting members connect the electric terminals of the power storage components adjacent to each other. The holder holds the connecting members. The holder includes a surface including placing sections on which the connecting members are placed. The holder includes restricting portions fitting on the connecting members placed on the placing sections to restrict removal of the connecting members from the holder and displacement of the connecting members from the placing sections without surrounding walls that surround the connecting members place on the placing section.

The removal and of the connecting members is less likely to occur and positioning of the connecting members is performed with the configuration that is simpler than a configuration including the surrounding walls that surround the connecting members. This configuration is preferable for a low voltage power storage module in which isolation between the adjacent connecting members is not highly required.

The holder may include insertion holes in which the electric terminals are inserted at positions adjacent to the placing sections.

In the configuration in which the holder includes the insertion holes in which the electric terminals are inserted at the positions adjacent to the placing sections, it is difficult to position the connecting members with the surrounding walls located adjacent to the connecting members to contact the connecting members. Even in such a case, with the restricting portions, the removal of the connecting members is less likely to occur and the positioning of the connecting member is performed with the simple configuration.

The connecting members may include fitting projections protruding from first edges of edges of the connecting members opposed to each other and fitting recesses recessed from second edges of the edges. The restricting portions may include restricting receptacles at first ends of the placing sections and restricting tabs at second ends of the placing sections. The restricting receptacles may include restricting recesses in which the fitting projections are insertable. The restricting tabs may be held in the fitting recesses and fitted on the connecting members.

According to the configuration, in a production of the connecting members by punching, each bus bar is punched from a base metal such that the fitting projection is prepared from a remaining portion of the base metal in a shape along a shape of the fitting recess of the previously punched bus bar. Therefore, extra portions to be discard after the punching can be minimized and thus a waste of the material can be minimized.

Advantageous Effects of Invention

According to the connector module and the power storage module disclosed herein, connectors can be retained and positioned with a simple configuration.

BRIEF DESCRIPTION OF THE DRAWINGS

FIG. 9 is a plan view illustrating punching of a bus bar from a base metal.

MODES FOR CARRYING OUT THE INVENTION

A first embodiment will be described with reference to FIGS. 1 to 9. A power storage module 1 in this embodiment may be a low-voltage battery installed in a vehicle that does not use electric energy to produce a driving force such as a gasoline-powered vehicle. The power storage module 1 includes a power storage component unit 10G and a connector module 20. The power storage component unit 10G includes power storage components 10. The connector module 20 is attached to the power storage component unit 10G to electrically connect the power storage components 10.

Power Storage Component Unit 10G and Power Storage Component 10

Figure 2:
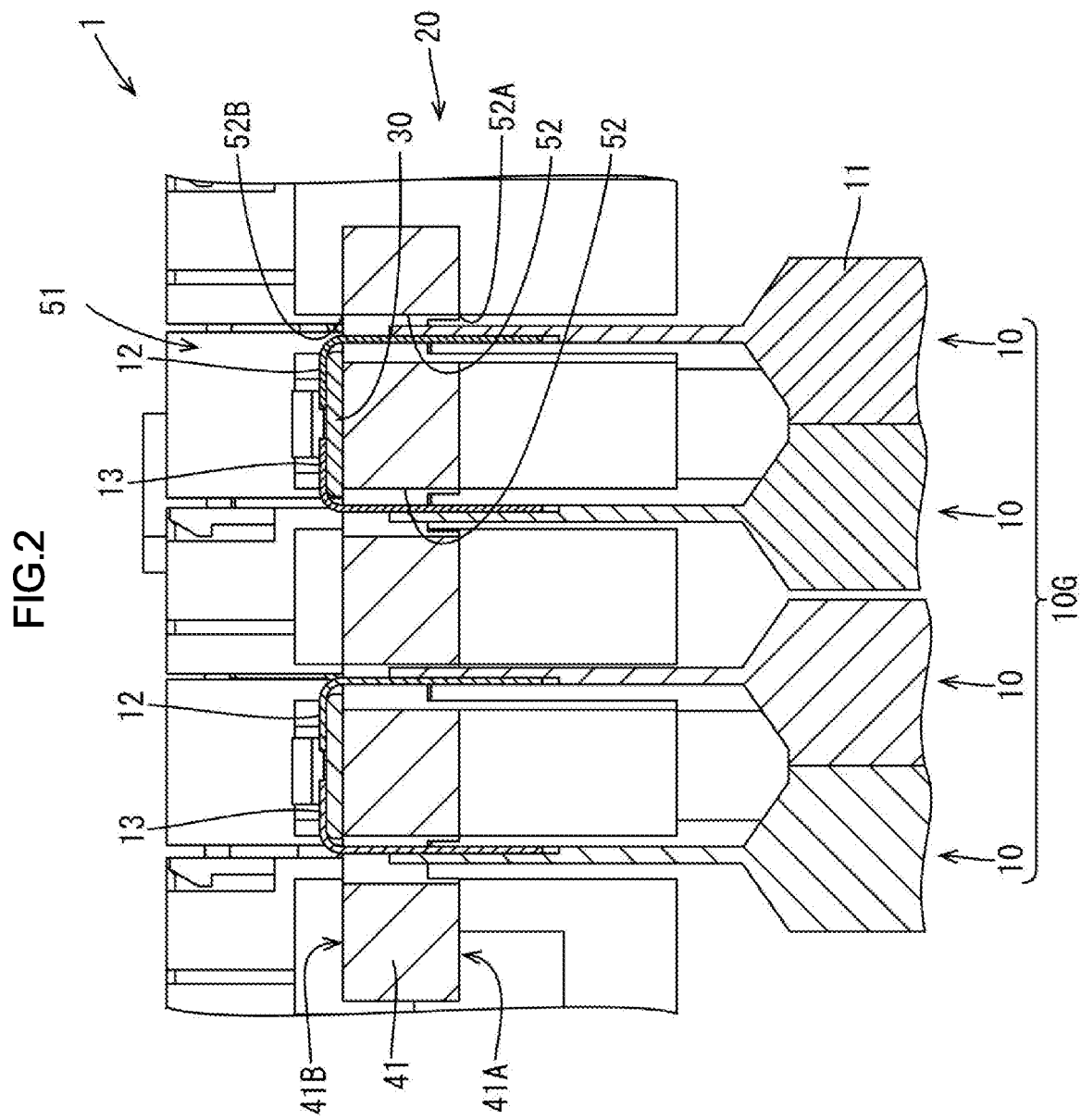
FIG. 2 is a cross-sectional view along line A-A in FIG. 1.

Each of the power storage components 10 in this embodiments is a laminated type battery cell having a rectangular flat box shape. As illustrated in FIG. 2, each power storage component 10 includes a battery body 11 and a pair of electric terminals (a positive terminal 12, a negative terminal 13). The battery body 11 includes a power element (not illustrated) wrapped with laminated films. The battery body 11 includes an end that is welded. The electric terminals 12 and 13 are lead terminals that are in foil forms and project outward from an edge of the battery body 11 (an upper edge in FIG. 2) and connected to the power element.

The power storage components 10 (four of them in this embodiment) are stacked to constitute the power storage component unit 10G. As illustrated in FIG. 2, the power storage components 10 are disposed such that the electric terminals 12 and 13 of the power storage components adjacent to each other are in opposite polarities (e.g., the positive terminal 12 of one of the power storage components 10 is adjacent to the negative terminal 13 of the adjacent power storage component 10).

Connector Module 20

Figure 3:
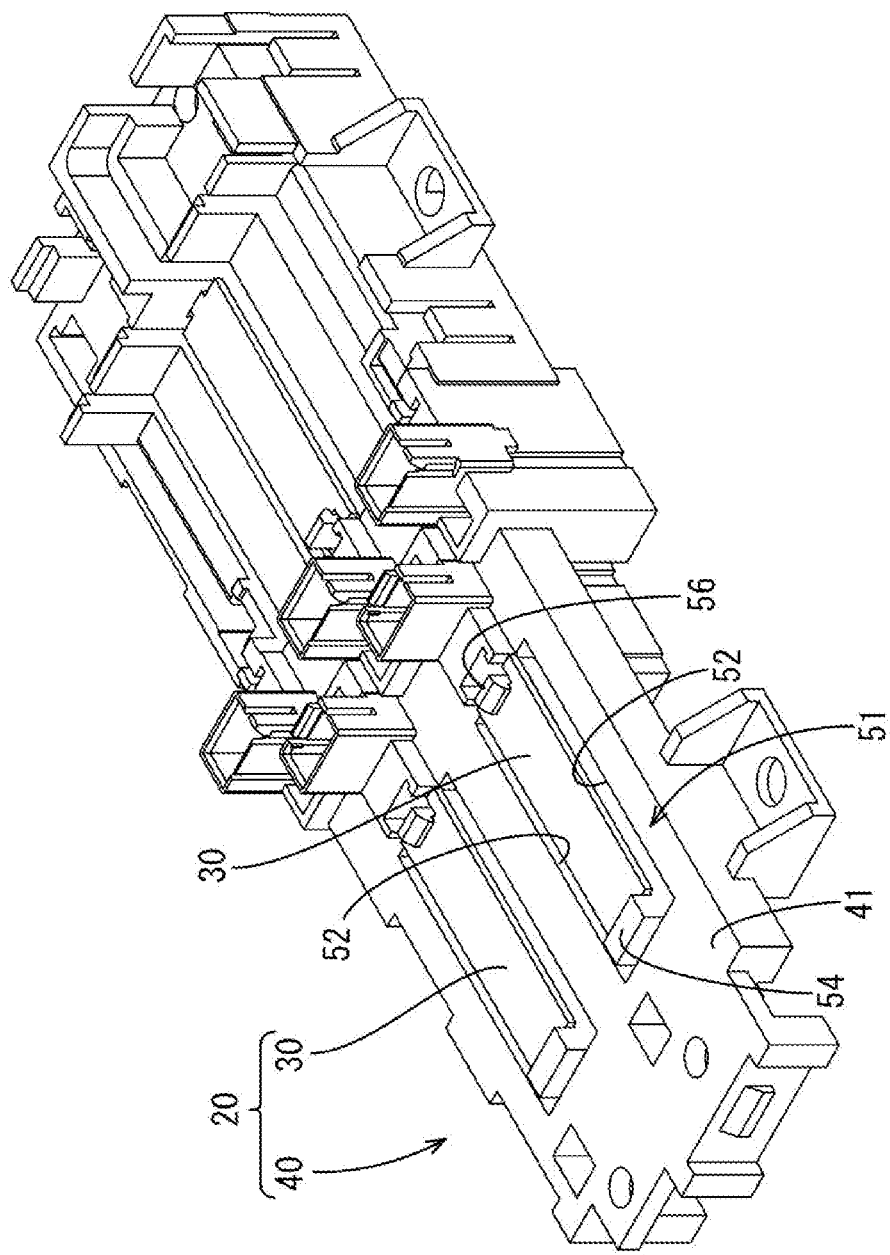
FIG. 3 is a perspective view of a connector module in the embodiment.

As illustrated in FIG. 3, the connector module 20 includes bus bars 30 (an example of connecting members) and a holder 40. The holder 40 holds the bus bars 30. The holder 40 is attached to the power storage component unit 10G.

Figure 8:
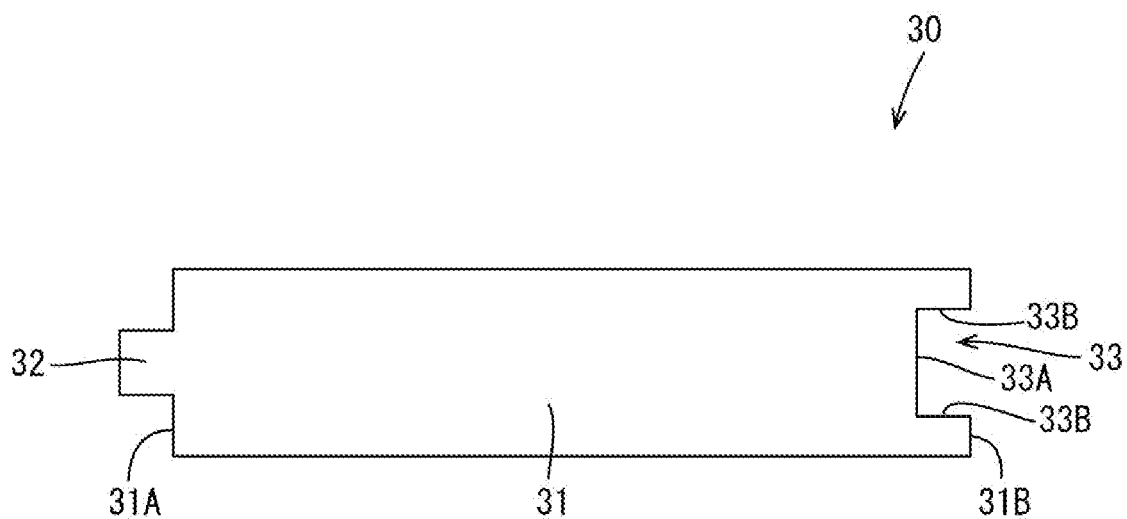
FIG. 8 is a plan view of a bus bar.

The bus bars 30 are made of a material including metal having conductivity. As illustrated in FIG. 8, each bus bar 30 includes a bus bar body 31 and a fitting projection 32. The bus bar body 31 has an elongated rectangular plate shape. The fitting projection 32 protrudes from the bus bar body 31. The fitting projection 32 is a rectangular plate shaped portion that protrudes from a first edge 31A of edges of the bus bar body 31 opposed to each other (a left edge in FIG. 8). The bus bar body 31 includes a fitting recess 33 that is recessed from a second edge 31B of the bus bar body 31 (a right edge in FIG. 8). The fitting recess 33 is defined by a bottom edge 33A and side edges 33B. The bottom edge 33A is located inner than the second edge 31B. The side edges 33B connect the bottom edge 33A to the second edge 31B. The fitting projection 32 and the fitting recess 33 are located at the same level with respect to a width direction of the bus bar body 31 (at the middle between long edges).

As illustrated in FIG. 9, in a production of the bus bars 30 having such a shape, the bus bars 30 are punched from the band-shaped base metal 80 in sequence using a press die. Each bus bar 30 is punched from the base metal 80 such that the fitting projection 32 is prepared from a remaining portion of the base metal 80 in a shape along a shape of the fitting recess 33 of the previously punched bus bar 30. Therefore, extra portions 81 to be discard after the punching can be minimized and thus a waste of the material can be minimized.

Figure 4:
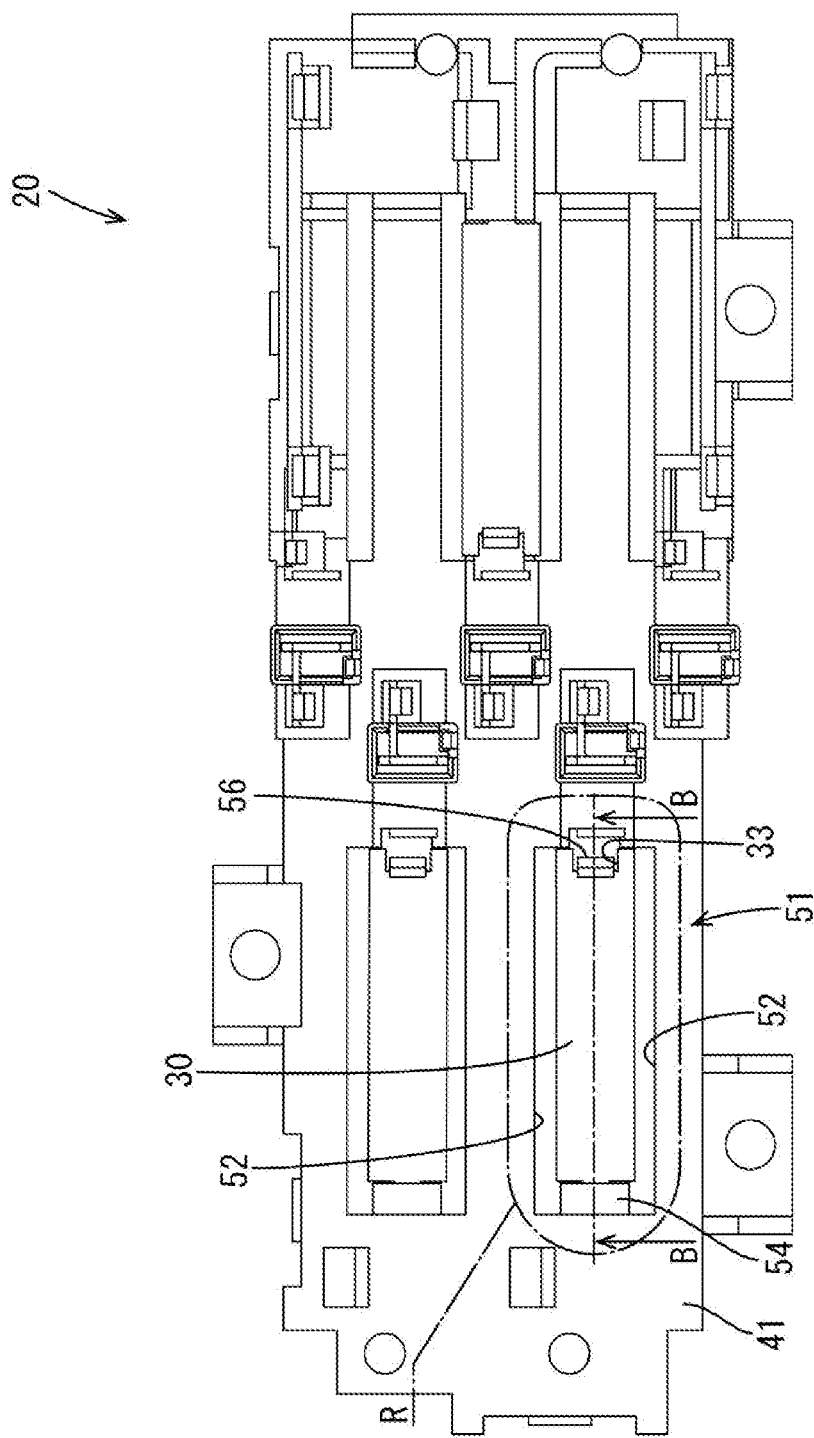
FIG. 4 is a plan view of the connector module in the embodiment.
Figure 5:
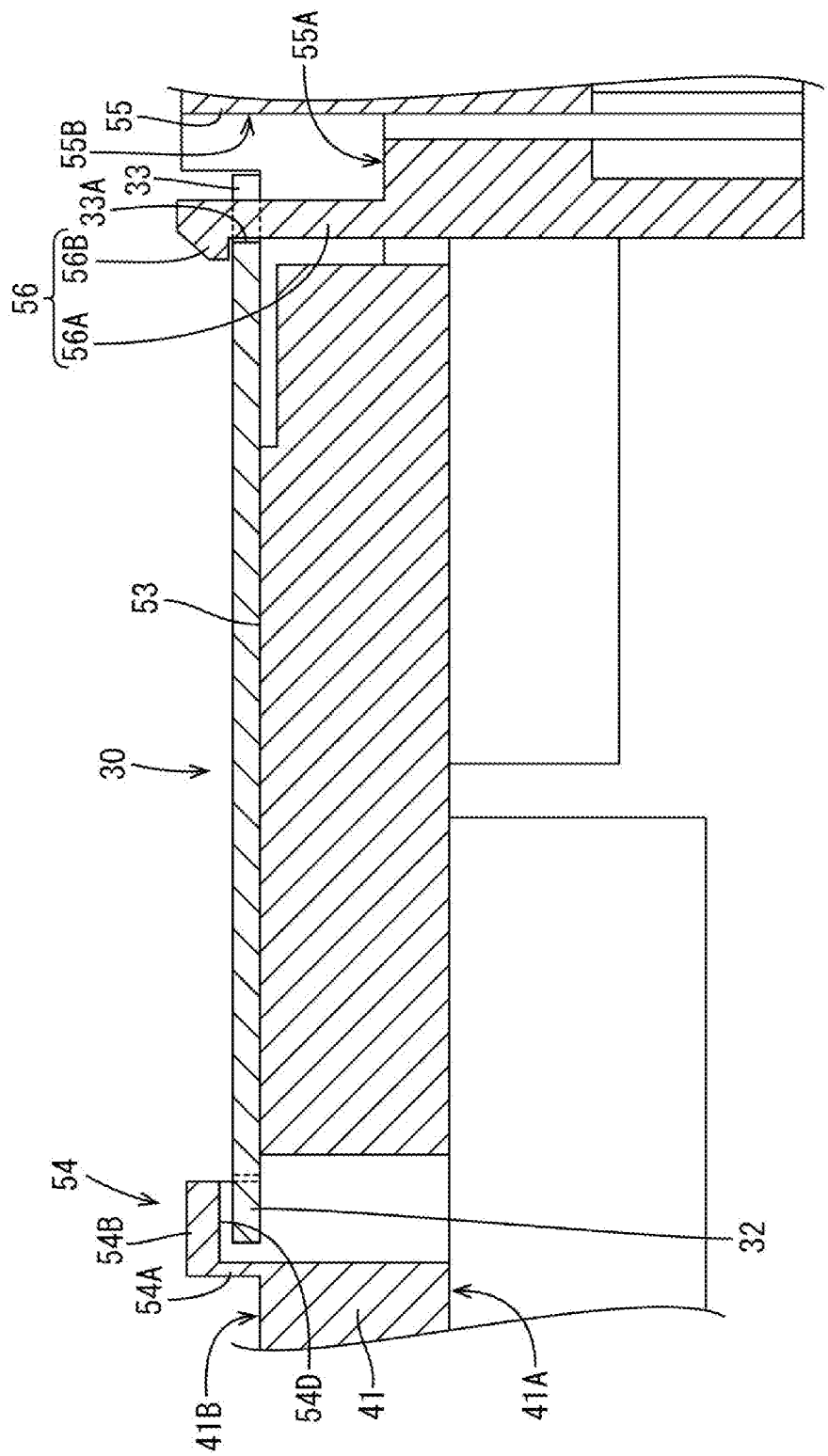
FIG. 5 is a cross-sectional view along line B-B in FIG. 4.
Figure 7:
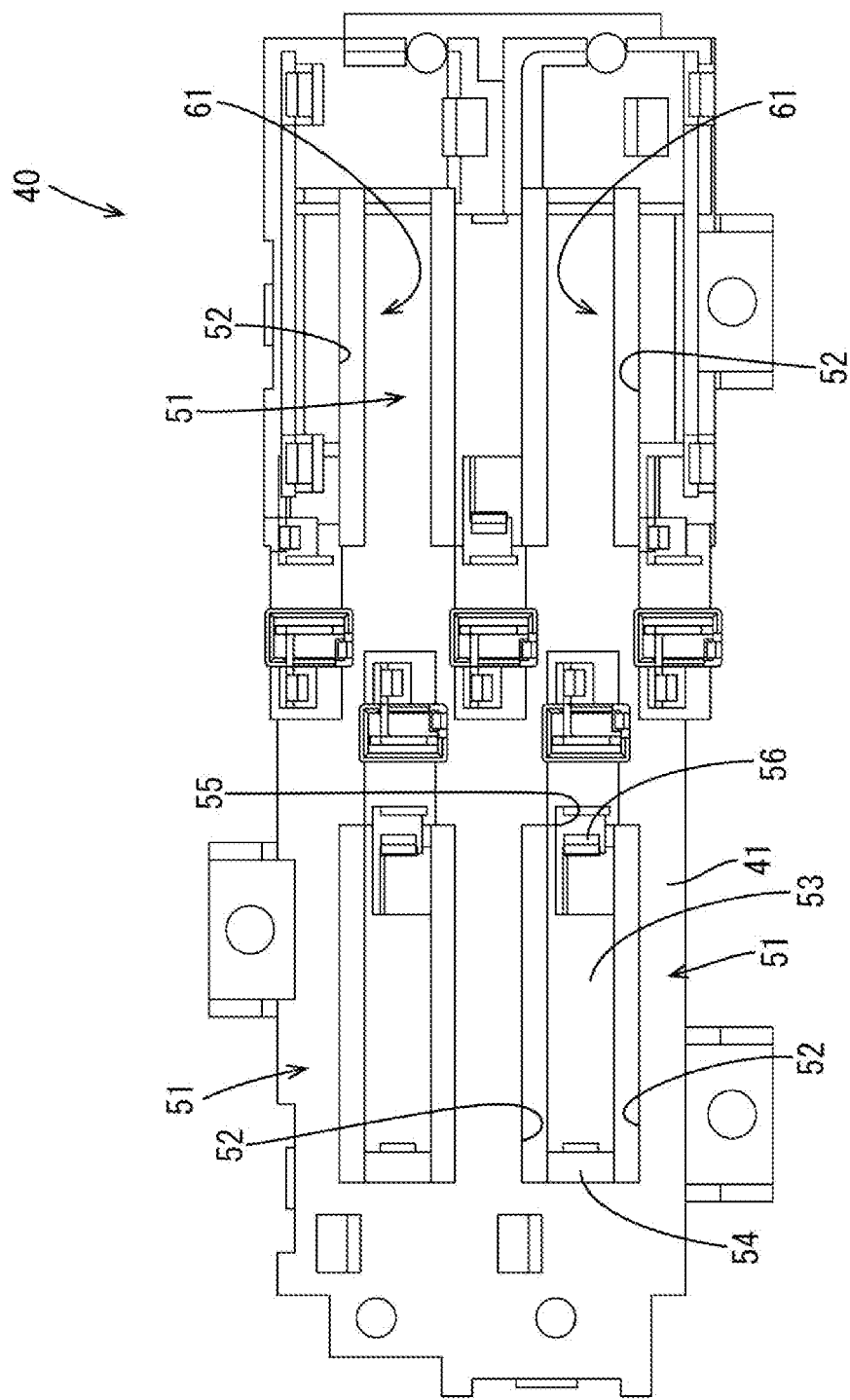
FIG. 7 is a plan view of a holder in the embodiment.

The holder 40 is made of synthetic resin. As illustrated in FIGS. 3, 4 and 7, the holder 40 includes a holder body 41 having a rectangular thick plate shape. As illustrated in FIGS. 2 and 5, the holder body 41 includes a front surface and a back surface, one of which is a component opposed surface 41A and the other is a bus bar holding surface 41B. The component opposed surface 41A is opposed to the power storage component unit 10G. The bus bar holding surface 41B holds the bus bar 30. A half of the holder body 41 on a first edge side (a left half in FIG. 7) includes two bus bar holding portions 51 that are parallel to each other. The other half of the holder body 41 on a second edge side (a right half in FIG. 7) includes two connecting terminal holding portions 61 and one bus bar holding portion 51 that are parallel to each other. The bus bar holding portion 51 is located between the connecting terminal holding portions 61.

The bus bar holding portions 51 have the same configuration and thus one of the bus bar holding portions 51 (the bus bar holding portion 51 at the lower left in FIG. 7) will be described in detail.

As illustrated in FIGS. 4 and 7, the bus bar holding portion 51 includes a pair of slits 52 (example of insertion holes) and restricting portions (a restricting receptacle 54 and a restricting tab 56). The electric terminals 12 and 13 are inserted into the slits 52. The restricting portions restrict removal and displacement of the bus bar 30.

As illustrated in FIG. 2, the slits 52 include inlets 52A in the component opposed surface 41A and outlets 52B in the bus bar holding surface 41B. The electric terminals 12 and 13 are inserted into the slits 52 through the inlets 52A and drawn from the slits 52 through the outlets 52B. The slits 52 run through the holder body 41 in the thickness direction. As illustrated in FIG. 7, the slits 52 are parallel to each other with a gap therebetween. A section of the bus bar holding surface 41B defined by the outlets 52B of the slits 52 is defined as a bus bar placing section (example of a placing section) on which the bus bar 30 is placed. Namely, the bus bar holding portion 51 includes the slits 52 in which the electric terminals 12 and 13 are inserted at positions adjacent to the bus bar placing section 53.

The bus bar holding portion 51 includes the restricting receptacle 54 at a first end of the bus bar placing section 53 (at the left end in FIG. 7) and the restricting tab 56 at a second end of the bus bar placing section 53 (at the right end in FIG. 7).

Figure 6:
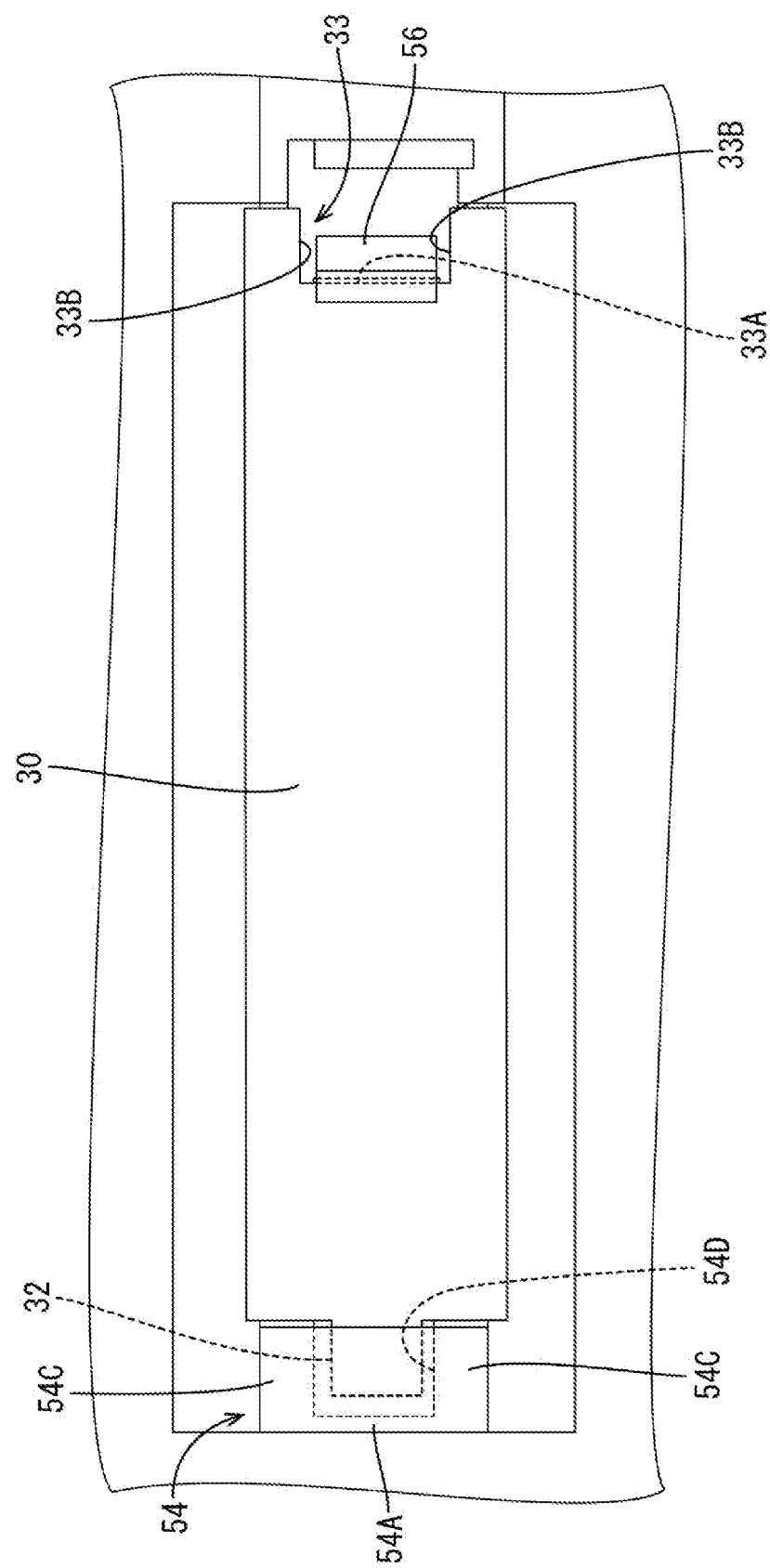
FIG. 6 is a magnified view of a section inside a circle in FIG. 4.

As illustrated in FIGS. 5 and 6, the restricting receptacle 54 includes a bottom wall portion 54A, a top wall portion 54B, and sidewall portions 54C. The bottom wall portion 54A protrudes from the first edge of the bus bar placing section 53 at a right angle. The top wall portion 54B extends from a distal end of the bottom wall portion 54A toward the second end of the bus bar placing section 53 to be perpendicular to the bottom wall portion 54A. The sidewall portions 54C extend perpendicular to the bottom wall portion 54A and the top wall portion 54B. The sidewall portions 54C are separated from each other. A space defined by the bottom wall portion 54A, the top wall portion 54B, and the sidewall portions 54C is defined as a restricting recess 54D in which the fitting projection 32 of the bus bar 30 can be placed.

As illustrated in FIG. 5, the restricting tab holding portion 55 that is recessed from the bus bar holding surface 41B is provided at the second end of the bus bar placing section 53.

The restricting tab holding portion 55 is a recess defined by a bottom surface 55A and a peripheral wall surface 55B. The bottom surface 55A is located on an inner side than the bus bar holding surface 41B (closer to the component opposed surface 41A). The peripheral wall surface 55B connects the bottom surface 55A to the bus bar holding surface 41B. The restricting tab holding portion 55 have an opening in the bus bar holding surface 41B. As illustrated in FIG. 5, the restricting tab 56 includes a flexible portion 56A and a fitting projection 56B. The flexible portion 56A extends from the bottom surface 55A. The flexible portion 56A is a plate spring portion including a distal end that protrudes outward from the restricting tab holding portion 55. The flexible portion 56A is flexible in a direction to be closer or separated from the restricting receptacle 54 (the horizontal direction in FIG. 5). The fitting projection 56B protrudes from a distal end of the flexible portion 56A toward the restricting receptacle 54 to be fitted on the bus bar 30.

To attach each bus bar 30 to the corresponding bus bar holding portion 51, first, the fitting projection 32 is inserted into the restricting recess 54D. Next, the restricting tab 56 is warped to be away from the restricting receptacle 54 and the bus bar 30 is placed on the bus bar placing section 53. Finally, the restricting tab 56 is restored from elastic deformation so that the restricting tab enters into the fitting recess 33 and the fitting projection 56B is fitted on a section of the bus bar 30 adjacent to the bottom edge 33A of the fitting recess 33.

As illustrated in FIG. 5, removal of the bus bar 30 from the bus bar holding portion 51 (upward in FIG. 5) is restricted with the fitting projection 56B and the restricting receptacle 54. As illustrated in FIG. 6, the fitting projection 32 is located between the sidewall portions 54C and the restricting tab 56 is located between the side edges 33B. Therefore, when the bus bar 30 moves in the width direction (toward or away from the adjacent bus bars 30, the vertical direction in FIGS. 4 and 6), the fitting projection 32 may contact the sidewall portion 54C and the fitting projection 56B may contact the side edge 33B, that is, further movement of the bus bar 30 is restricted. According to the configuration, the displacement of the bus bar 30 in the width direction is restricted.

Figure 1:
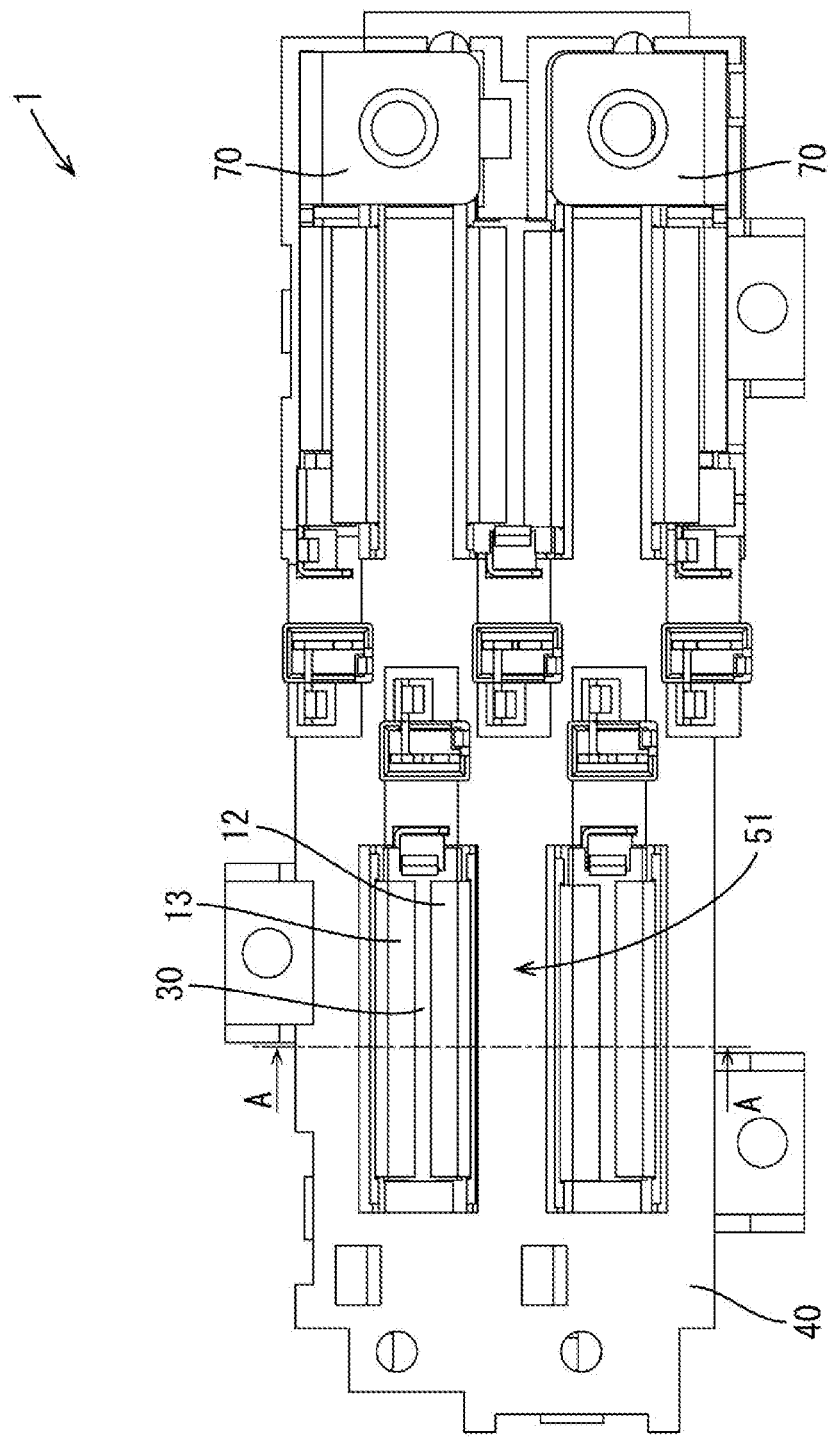
FIG. 1 is a plan view of an power storage module in an embodiment.

As illustrated in FIG. 7, each of the connecting terminal holding portions 61 includes a slit 52 having the same configuration as the slit 52 included in the bus bar holding portion 51. As illustrated in FIG. 1, each of the connecting terminal holding portions 61 holds connecting terminals 70 that are provided for connection between the power storage component unit 10G and an external device.

Attachment of Connector Module to Power Storage Component Unit 10G

As illustrated in FIG. 2, the connector module 20 is disposed along the power storage component unit 10G such that the component opposed surface 41A faces the power storage component unit 10G. The electric terminals 12 and 13 of the power storage components 10 are inserted in the slits 52 of the bus bar holding portions 51. Next, sections of the electric terminals 12 and 13 projecting from the bus bar holding surface 41B are bent over the bus bars 30. The electric terminals 12 and 13 of the adjacent power storage components 10 in opposite polarities are placed on each bus bar 30. For example, on the bus bar 30 held by one of the bus bar holding portion 51 (the rightmost bus bar holding portion 51 in FIG. 2), the positive terminal 12 of one of the power storage components 10 (the rightmost power storage component in FIG. 2) and the negative terminal 13 of the adjacent power storage component 10 (the second rightmost power storage component in FIG. 2) are placed. The positive terminal 12 and the negative terminal 13 placed on the bus bar 30 are configured not to directly contact each other. Similarly, sections of the corresponding electric terminals 12 and 13 are drawn from the slits 52 of the connecting terminal holding portions 61 and placed on the connecting terminals 70.

The sections of the electric terminals 12 and 13 placed on the bus bars 30 are electrically and physically connected to the bus bar 30 by laser welding. Similarly, the sections of the electric terminals 12 and 13 placed over the connecting terminals 70 are electrically and physically connected to the connecting terminals 70 by laser welding. Through these steps, the power storage module 1 is complete.

CONCLUSION

According to the embodiment described above, the power storage module 1 includes the power storage component unit 10G and the connector module 20. The power storage component unit 10G includes the power storage components 10 that include the electric terminals (the positive terminals 12 and the negative terminals 13) located on one side. The connector module 20 is attached to the power storage component unit 10G to electrically connect the power storage components 10. The connector module 20 includes the bus bars 30 and the holder 40. The bus bars 30 connect the electric terminals 12 and 13 of the adjacent power storage components 10 together. The holder 40 holds the bus bars 30. The holder 40 includes the bus bar holding surface 41B that includes the bus bar placing sections 53. The bus bars 30 are placed on the bus bar placing sections 53. The holder 40 includes the restricting receptacles 54 and the restricting tabs 56 fitted on the bus bars 30 that are placed on the bus bar placing sections 53 for restricting removal of the bus bars 30 from the holder 40 and displacement of the bus bars 30 from the bus bar placing sections 53.

The removal of the bus bars 30 is restricted and the positioning of the bus bars 30 is performed with the configuration that is simpler than the configuration that includes surrounding walls that surround the bus bars 30. This configuration is preferable for a battery installed in a vehicle that does not use electric energy to produce a driving force such as a gasoline-powered vehicle. Such a battery generates a relatively low voltage and thus isolation between bus bars with surrounding walls that surround the bus bars is not higher required.

The holder 40 includes the slits 52 in which the electric terminals 12 and 13 are inserted at the positions adjacent to the bus bar placing sections 53.

In the configuration including the slits 52 at the positions adjacent to the bus bar placing sections 53, it is difficult to include the surrounding walls at positions adjacent to the bus bars 30 to contact the bus bars 30 for positioning the bus bars 30. In such a case, the removal of the bus bars 30 is less likely to occur and the positioning of the bus bars 30 is performed with the restricting receptacles and the restricting tabs 56, that is, with a simple configuration.

Each bus bar 30 includes the fitting projection 32, and the fitting recess 33. The fitting projection 32 protrudes from the first edge 31A of the edges opposed to each other. The fitting recess 33 is recessed from the second edge 31B. Each restricting receptacle 54 includes the restricting recess 54D disposed at the first end of the bus bar placing section 53. The fitting projection 32 is insertable in the restricting recess 54D. The restricting tab is disposed at the second end of the bus bar placing section 53 and held in the fitting recess 33. The restricting tab 56 is fitted on the bus bar 30.

According to the configuration, in the production of the bus bars 30 by punching, the fitting projection 32 is prepared from the remaining portion of the base metal 80 in a shape along the shape of the fitting recess 33 of the previously punched bus bar 30. Therefore, extra portions 81 to be discard after the punching can be minimized and thus a waste of the material can be minimized.

Other Embodiments

The technology disclosed herein is not limited to the embodiment described above and illustrated in the drawings. For example, the following embodiments will be included in the technical scope of the technology.

(1) In the above embodiment, the power storage component unit 10G includes four power storage components 10. However, any number of power storage components can be included.

(2) The number of connectors held by the holder can be altered based on the number of the power storage components.

EXPLANATION OF SYMBOLS

1: Power storage module
10: Power storage component
10G: Power storage component unit
12: Positive terminal (Electric terminal)
13: Negative terminal (Electric terminal)
20: Connector module
30: Bus bar (Connecting member)
32: Fitting projection
33: Fitting recess
40: Holder
52: Slit
53: Bus bar placing section (Placing section)
54D: Restricting recess
54: Restricting receptacle (Restricting portion)
56: Restricting tab (Restricting portion)

The invention claimed is:

1. A connector module attached to a power storage component unit including power storage components including electric terminals on one side to electrically connect the power storage components, the connector module comprising:
connecting members connecting the electric terminals of the power storage components adjacent to each other; and
a holder holding the connecting members, wherein
the holder includes a surface including placing sections on which the connecting members are placed,
the holder includes restricting portions fitting on the connecting members placed on the placing sections to restrict removal of the connecting members from the holder and displacement of the connecting members from the placing sections without surrounding walls that surround the connecting members placed on the placing sections,
the connecting members include fitting projections protruding from first edges of edges of the connecting members opposed to each other and fitting recesses recessed from second edges of the edges,
the restricting portions include restricting receptacles at first ends of the placing sections and restricting tabs at second ends of the placing sections,
the restricting receptacles include restricting recesses in which the fitting projections are insertable, and
the restricting tabs are held in the fitting recesses and fitted on the connecting members.

2. The connector module according to claim 1, wherein the holder incudes insertion holes in which the electric terminals are inserted at positions adjacent to the placing sections.

3. A power storage module comprising:
a power storage component unit including power storage components including electric terminals on one side; and
a connector module attached to the power storage component to electrically connect the power storage components, the connector module including:
connecting members connecting the electric terminals of the power storage components adjacent to each other; and
a holder holding the connecting members, wherein
the holder includes a surface including placing sections on which the connecting members are placed,
the holder includes restricting portions fitting on the connecting members placed on the placing sections to restrict removal of the connecting members from the holder and displacement of the connecting members from the placing sections without surrounding walls that surround the connecting members placed on the placing sections,
the connecting members include fitting projections protruding from first edges of edges of the connecting members opposed to each other and fitting recesses recessed from second edges of the edges,
the restricting portions include restricting receptacles at first ends of the placing sections and restricting tabs at second ends of the placing sections,
the restricting receptacles include restricting recesses in which the fitting projections are insertable, and
the restricting tabs are held in the fitting recesses and fitted on the connecting members.

4. The connector module according to claim 1, wherein each of the restricting receptacles includes a bottom wall portion, a top wall portion, and two sidewall portions,
the bottom wall portion protrudes from one of the first ends of one of the placing sections,
the top wall portion extends from the bottom wall portion toward one of the second ends of the one of the placing section,
the sidewall portions extend perpendicular to the bottom wall portion and the top wall portion,
the side wall portions are separated from each other, and
each of the restricting recesses is a space defined by the bottom wall portion, the top wall portion, and the sidewall portions.

5. The connector module according to claim 4, wherein the restricting tabs include flexible portions and fitting projections,
the flexible portions are flexible in a direction to be closer or separated from the restricting receptacles, and
the fitting projections protrude from the flexible portions to be fitted on the connecting members.

6. The connector module according to claim 2, wherein each of the restricting receptacles includes a bottom wall portion, a top wall portion, and two sidewall portions, the bottom wall portion protrudes from one of the first ends of one of the placing sections, the top wall portion extends from the bottom wall portion toward one of the second ends of the one of the placing section, the sidewall portions extend perpendicular to the bottom wall portion and the top wall portion, the side wall portions are separated from each other, and each of the restricting recesses is a space defined by the bottom wall portion, the top wall portion, and the sidewall portions.

7. The connector module according to claim 6, wherein the restricting tabs include flexible portions and fitting projections, the flexible portions are flexible in a direction to be closer or separated from the restricting receptacles, and the fitting projections protrude from the flexible portions to be fitted on the connecting members.

8. The connector module according to claim 1, wherein the restricting tabs include flexible portions and fitting projections, the flexible portions are flexible in a direction to be closer or separated from the restricting receptacles, and the fitting projections protrude from the flexible portions to be fitted on the connecting members.

9. The connector module according to claim 2, wherein the restricting tabs include flexible portions and fitting projections, the flexible portions are flexible in a direction to be closer or separated from the restricting receptacles, and the fitting projections protrude from the flexible portions to be fitted on the connecting members.

\* \* \* \* \*